(12) United States Patent
Stewart et al.

(10) Patent No.: US 12,189,388 B2
(45) Date of Patent: Jan. 7, 2025

(54) MULTIPLE INERTIAL MEASUREMENT UNIT SENSOR FUSION USING MACHINE LEARNING

(71) Applicant: Honeywell International Inc., Charlotte, NC (US)

(72) Inventors: Andrew Stewart, Chanhassen, MN (US); Christopher J. Mauer, Roseville, MN (US); Shashank Shivkumar, St. Louis Park, MN (US); Thomas Jakel, Forrest Lake, MN (US)

(73) Assignee: Honeywell International Inc., Charlotte, NC (US)

( * ) Notice: Subject to any disclaimer, the term of this patent is extended or adjusted under 35 U.S.C. 154(b) by 416 days.

(21) Appl. No.: 17/569,316

(22) Filed: Jan. 5, 2022

(65) Prior Publication Data
US 2023/0213936 A1     Jul. 6, 2023

(51) Int. Cl.
*G06N 20/00*   (2019.01)
*G01P 15/02*   (2013.01)
*G05D 1/00*    (2024.01)

(52) U.S. Cl.
CPC .......... *G05D 1/0088* (2013.01); *G01P 15/02* (2013.01); *G06N 20/00* (2019.01)

(58) Field of Classification Search
CPC ...... G05D 1/0088; G05D 1/027; G01P 15/02; G06N 20/00; G06N 3/0442; G06N 3/0455; G06N 3/0464; G06N 3/09; G01C 21/16

See application file for complete search history.

(56) References Cited

U.S. PATENT DOCUMENTS 5,554,273 A    9/1996   Demmin et al.
9,665,100 B2   5/2017   Shashua et al.
(Continued)

FOREIGN PATENT DOCUMENTS

CN   101158588 A   4/2008
CN   107148553 A   9/2017
(Continued)

OTHER PUBLICATIONS

Safavi, S., Mohammad, A. S., Hamid, H., & Fallah, S. (2021). Multi-sensor fault detection, identification, isolation and health forecasting for autonomous vehicles. Sensors, 21(7), 2547. doi: https://doi.org/10.3390/s21072547 (Year: 2021).*
Huang, H., Zhou, P., Li, Y., & Sun, F. (2021). A lightweight attention-based CNN model for efficient gait recognition with wearable IMU sensors. Sensors, 21(8), 2866. doi: https://doi.org/10.3390/s21082866. (Year: 2021).*
(Continued)

*Primary Examiner* — Hunter B Lonsberry
*Assistant Examiner* — Daniel M. Robert
(74) *Attorney, Agent, or Firm* — Fogg & Powers LLC

(57) ABSTRACT

Systems and methods for multiple inertial measurement unit sensor fusion using machine learning are provided herein. In certain embodiments, a system includes inertial sensors that produce inertial measurements, a memory unit that stores a fusion model produced by at least one machine learning algorithm, and a processor that receives inertial measurements, where the processor applies the fusion model to the inertial measurements. The fusion model directs the processor to extract features from the inertial measurements, and to select inertial measurements based on a sensor in the plurality of inertial sensors that produced the inertial measurements. Also, the fusion model directs the processor to apply weights to the selected inertial measurements based on the extracted features, to apply compensation coefficients to the selected inertial measurements, and to fuse the selected inertial measurements into an inertial navigation solution.

20 Claims, 4 Drawing Sheets

(56) References Cited

U.S. PATENT DOCUMENTS

| | | | |
|---|---|---|---|
| 10,611,371 | B2 | 4/2020 | Kusano et al. |
| 2010/0283832 | A1 | 11/2010 | Lin |
| 2017/0132334 | A1 | 5/2017 | Levinson et al. |
| 2018/0032871 | A1* | 2/2018 | Holt ............... G06N 3/045 |
| 2018/0053056 | A1 | 2/2018 | Rabinovich et al. |
| 2018/0096259 | A1 | 4/2018 | Andrews et al. |
| 2018/0137642 | A1 | 5/2018 | Malisiewicz et al. |
| 2018/0180420 | A1* | 6/2018 | Korenberg ............... G06N 3/08 |
| 2018/0275658 | A1* | 9/2018 | Iandola ............... G06F 30/20 |
| 2019/0056231 | A1 | 2/2019 | Bai et al. |
| 2019/0079536 | A1 | 3/2019 | Zhu et al. |
| 2019/0139205 | A1 | 5/2019 | El-Khamy et al. |
| 2019/0179317 | A1* | 6/2019 | England ............... G05D 1/0231 |
| 2019/0265703 | A1 | 8/2019 | Hicok et al. |
| 2019/0266418 | A1 | 8/2019 | Xu et al. |
| 2019/0298224 | A1 | 10/2019 | Rahman et al. |
| 2020/0160972 | A1 | 5/2020 | Bériault et al. |
| 2020/0311514 | A1* | 10/2020 | Speranzon ............ G01C 25/00 |
| 2020/0355503 | A1 | 11/2020 | Chen et al. |
| 2021/0213616 | A1 | 7/2021 | Ross et al. |
| 2022/0396289 | A1* | 12/2022 | Li ............... G01C 21/3407 |
| 2023/0097169 | A1* | 3/2023 | Dwivedi ............... G06F 18/29 706/15 |
| 2023/0146647 | A1* | 5/2023 | Byeon ............... G06N 3/0464 706/26 |
| 2023/0213936 | A1* | 7/2023 | Stewart ............... G06N 3/044 701/524 |

FOREIGN PATENT DOCUMENTS

| | | |
|---|---|---|
| CN | 107290801 A | 10/2017 |
| CN | 107390246 A | 11/2017 |
| CN | 107655472 A | 2/2018 |
| CN | 109188026 A | 1/2019 |
| CN | 110749337 A | 2/2020 |
| CN | 111160072 A | 5/2020 |
| CN | 111707260 A | 9/2020 |
| CN | 112880672 A | 6/2021 |
| CN | 113392904 A | 9/2021 |
| WO | 0073815 A1 | 12/2000 |
| WO | 2022262878 A1 | 12/2022 |

OTHER PUBLICATIONS

D. Weber, C. Gühmann and T. Seel, "Neural Networks Versus Conventional Filters for Inertial-Sensor-based Attitude Estimation," 2020 IEEE 23rd International Conference on Information Fusion (Fusion), Rustenburg, South Africa, 2020, pp. 1-8, doi: 10.23919/FUSION45008.2020.9190634 (Year: 2020).*

Das, Himanish, et al., "A Deep Dive Into Deep Learning Techniques for Solving Spoken Language Identification Problems" Intelligent Speech Signal Processing, Chapter 5 pp. 87 through 91, Published 2019, Elsevier Inc.

Haarnoja, Tuomas, et al., "Backprop KF: Learning Discriminative Deterministic State Estimators" 30th Conference on Neural Information Processing Systems (NIPS 2016), Barcelona, Spain, pp. 1 through 9.

Jonschkowski, Rico et al., Differentialble Particle Filters: End-To-End Learning With Algorithmic Priors, arXiv:1805.11122v2 [cs.LG] May 30, 2018, pp. 1 through 9.

Lee, Michelle A. et al., "Multimodal Sensor Fusion With Differentiable Filters". arX1v:2010.13021v2 [cd.RO] Dec. 23, 2020, pp. 1 through 8.

Siddakatte, Ranjeeth et al., "Sensor Auto-Calibration Using Neural Networks for RISS Mechanization During Long GNSS Outages" 6th ESA International Colloquium on Scientific and Fundamental Aspects of the Galileo, Oct. 25-27, Valencia, Spain, pp. 1 through 8.

Speranzon, Alberto et al., "Tightly Coupled End-to End Multi-Sensor Fusion With Integrated Compensation", U.S. Appl. No. 16/371,868, filed Apr. 1, 2019, pp. 1 through 28, Published: US.

Subasi, Abdulhamit, "Machine Learning Techniques", Practical Machine Learning for Data Analysis Using Python, Chapter 3, pp. 182 through 183, Published 2020, Elsevier Inc.

European Patent Office, "Extended European Search Report", from from EP Application No. 20166033.9, from Foreign Counterpart to U.S. Appl. No. 16/371,868, filed Sep. 3, 2020, pp. 1 through 8, Published: EP.

Great Britain Intellectual Property Office, "Patents Act 1799: Search Report under Section 17(5)" from GB Application No. GB2218884. 1, from Foreign Counterpart to U.S. Appl. No. 17/569,316, filed Jun. 9, 2023, pp. 1 through 5, Published: GB.

* cited by examiner

MULTIPLE INERTIAL MEASUREMENT UNIT SENSOR FUSION USING MACHINE LEARNING

BACKGROUND

Many vehicles acquire motion information from on-vehicle inertial navigation systems. For example, vehicles that use inertial navigation systems include aircraft, unmanned aerial vehicles (UAVs), spacecraft, satellites, waterborne craft, guided missiles, guided munitions, land-based vehicles among other types of vehicles. Typically, these inertial navigation systems include processors that receive measurements from inertial measurement units (IMUs) that act as principal components for measuring the associated vehicle motion. Typically, IMUs use a combination of motion sensors (such as accelerometers and gyroscopes) to sense and report the specific force and angular rates for an associated vehicle.

Inertial navigation systems are often part of larger navigation systems. These navigation systems use the measurements from the IMUs with measurements from other sensors to calculate a navigation solution for the vehicle. Frequently, the navigation system performs a fusion operation to combine the measurements from the different sensors to find the navigation solution. The navigation solution may describe the position, velocity, and attitude of the vehicle with respect to a reference frame.

SUMMARY

Systems and methods for multiple inertial measurement unit sensor fusion using machine learning are provided herein. In certain embodiments, a system includes a plurality of inertial sensors that produce a plurality of inertial measurements. Also, the system includes one or more memory units configured to store at least one fusion model produced by at least one machine learning algorithm. Further, the system includes one or more processors configured to receive the plurality of inertial measurements, wherein the one or more processors apply the at least one fusion model to the plurality of inertial measurements. The at least one fusion model directs the one or more processors to extract features from the plurality of inertial measurements. Additionally, the at least one fusion model directs the one or more processors to select inertial measurements based on a sensor in the plurality of inertial sensors that produced the inertial measurement in the plurality of inertial measurements. Also, the at least one fusion model directs the one or more processors to apply weights to the selected inertial measurements based on the extracted features. Further, the at least one fusion model directs the one or more processors to apply compensation coefficients to the selected inertial measurements. Moreover, the at least one fusion model directs the one or more processors to fuse the selected inertial measurements into an inertial navigation solution.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1:
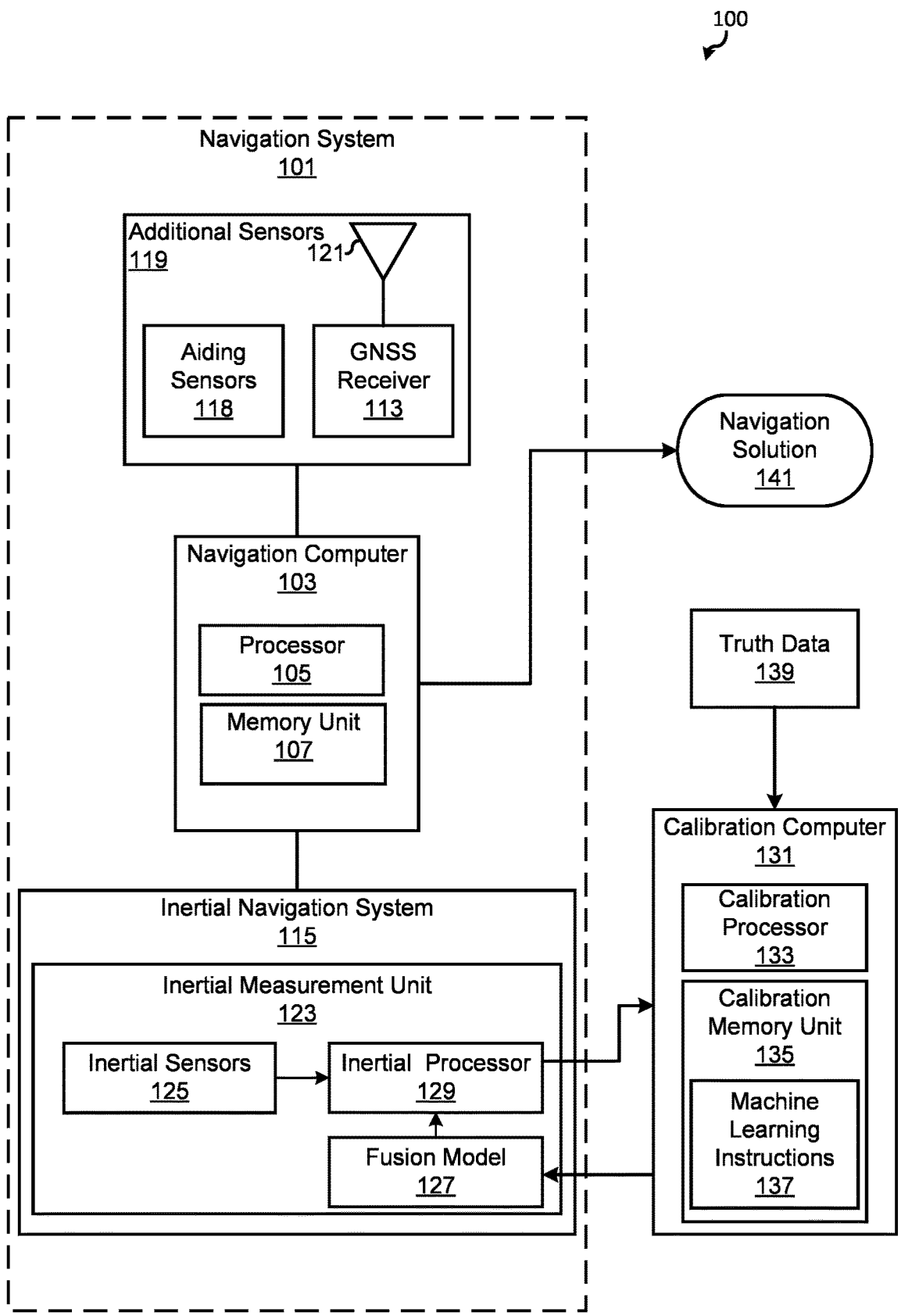
FIG. 1 is a schematic block diagram depicting a system for creating a model for fusing multiple inertial measurements according to an example embodiment described in the present disclosure.

Under common practice, the figures do not present scale representations of the various described features but show the various described features to emphasize aspects relevant to the example embodiments.

DETAILED DESCRIPTION

The following detailed description refers to the accompanying drawings that form a part of the present description. The drawings show, through illustration, specific illustrative embodiments. However, it is to be understood that other embodiments may be used and that logical, mechanical, and electrical changes may be made.

The present disclosure describes systems and methods for creating models for multiple inertial measurement unit sensor fusion using machine learning. In particular, systems described in the present disclosure include inertial measurement units (IMUs) having multiple inertial sensors. Machine learning algorithms are used to create models for fusing the measurements from the multiple sensors to provide an IMU output. For example, a system may use machine learning algorithms to create a model for extracting features from different inertial measurements provided by the separate sensors. Additionally, systems may use the machine learning algorithms to create a model for sensor selection and the application of weights to the separate sensor measurements. Further, systems may use machine learning algorithms to produce models for applying compensation coefficients to the weighted measurements and fusing the compensated measurements, where the model is applied by an IMU to provide compensated and fused sensor measurements as an output. When creating the model for the fusion of the sensor measurements, the machine learning algorithms extract the features, calculate the weights, and calculate the compensation by comparing inertial measurement data sets from the multiple inertial sensors against truth data. Using machine learning enables automation of the modeling process for the inertial measurement unit and enables dynamic weighing of the contribution from the different inertial sensors. Further, machine learning enables a processor to learn representations of the data streams suitable for fusion while compensating for the effects of noise.

Some IMUs include multiple inertial sensors. As used herein, inertial sensors refer to combinations of one or more accelerometers and gyroscope sensors that provide measurements of specific force and angular rates. The different sensors in the IMUs may have different performance characteristics based on the materials and the technology used to manufacture the sensors. The differences in materials and implementing technology may introduce various degrees of noise or errors or both into the measurements from the sensors. The sensor measurements and their associated noise and errors are frequently integrated over time when generating navigation estimates. The integration causes accumulated navigation errors that impact resultant navigation solutions that rely on inertial measurements. Thus, reducing the effects of noise and errors on IMU measurements improves resultant navigation solutions.

However, many sources can introduce errors into IMU measurements. For example, environmental factors and operational characteristics of the sensors can introduce errors into the IMU measurements. Environmental factors may include changes in temperature, air pressure, humidity, among other environmental factors that could cause the IMU operation to change along with operational changes that occur as the IMU ages. Manufacturing defects can also cause IMU sensors to produce errors. Additionally, sensors may have different performance limitations that affect the accuracy of provided measurements. Because of the large number of potential error sources, it is difficult to accurately characterize the effects of the errors on the IMU measurements using traditional characterization methods.

For example, IMUs are typically calibrated after fabrication using various methods (like least squares or polynomial fitting) to calculate compensation values for application to the sensor measurements. Additionally, throughout the operational life cycle of the IMU, the IMU may be exposed to changes in temperature, air pressure, humidity, and other environmental factors that could cause the IMU operation to change along with operational changes that occur as the IMU ages. As such, the IMU may be periodically recalibrated during periodic maintenance to compensate for the changes throughout the IMU life cycle.

The proper use of traditional calibration techniques calls for a suitable understanding of the physics of the sensors and how the sensors respond to changes in environmental conditions, such as temperature and pressure, to provide accurate and reliable IMU compensation. For example, the (Rate) Table Calibration (TCAL) process is an existing IMU sensor compensation technique. Rate tables are mechanical tables used to test and calibrate gyroscope and accelerometer sensors for IMUs and other inertial guidance systems. The TCAL process uses the following parametric model for an IMU:

$$x_{comp} = C \cdot (sf \cdot x_{raw} + \text{bias}) \quad (1)$$

where $x_{raw}$ represents raw inertial data, such as raw acceleration data (e.g., from an accelerometer) or raw angular rate data (e.g., from a gyroscope). The parameter $C \in \mathbb{R}^{3 \times 3}$ represents the (e.g., three-dimensional) misalignment matrix, whose entries, $C_{ij}$, represent the misalignment between the ith and jth axis. The scale factor in Equation (1) can be represented in matrix form as:

$$sf = \left(I + \begin{bmatrix} sf_x & 0 & 0 \\ 0 & sf_y & 0 \\ 0 & 0 & sf_z \end{bmatrix}\right) \in \mathbb{R}^{3 \times 3} \quad (2)$$

where the scale factor parameter in Equation (1) is split over the different axis, yielding Equation (2). As indicated above, the TCAL method utilizes a least-squares regression algorithm to find the optimal parameter values by minimizing the sum of the squared residuals resulting from differences in the observed (raw) data and the anticipated data based on a model. However, as discussed above, the TCAL IMU compensation technique requires the user to comprehend the physical characteristics of the sensors (e.g., gyroscopes and accelerometers) being used, how the existing environmental conditions (e.g., air temperature and pressure) affect the operation of the sensors, and the accuracy and reliability of the involved IMU sensor compensation process.

In certain embodiments, machine learning may create models for highly complex and unstructured data. Some machine learning algorithms use large amounts of data to train the data-driven models produced by the machine learning algorithms. Accordingly, machine learning algorithms can create data-driven models for navigation sensor operation using annotated raw and ground truth datasets for the modeled sensors. For IMU compensation, datasets used for creating data-driven models include raw IMU data and truth data (ground truth accelerations and angular rates from a rate table or a higher grade IMU, possibly with other test signals).

In certain embodiments, the machine learning algorithms may create the models for the fusing of multiple inertial sensors as a single process that receives the truth data as a single input along with the inertial measurement data sets. Alternatively, the machine learning algorithms may calculate the various values for the fusing of multiple inertial sensors as separate processes that each receive the truth data as an input. For example, a model for fusing of measurements from multiple inertial sensors to provide a single IMU output may include multiple steps that include the extraction of features from the different inertial data sets provided by the different inertial sensors, the selection of sensor measurements, the application of weights to selected sensor measurements, and the application of compensation to the weighted measurements for sensor fusion. Machine learning algorithms could create separate models for each of these different processes, where each model is created based on comparing the output of the particular model against received truth data. Alternatively, a machine learning algorithm could adjust a single model for performing the different processes based on a comparison of the final compensated and fused measurements against the truth data. Using machine learning to perform the fusion of the different IMU sensor measurements can reduce errors that are otherwise difficult to model and predict while combining measurements from different devices that operate with different underlying physics.

FIG. 1 is a block diagram of a system 100 that uses machine learning to create models for compensating errors and fusing measurements provided by inertial sensors 125 in an IMU 123. The navigation system 101 may be mountable to a vehicle, such as an aircraft, sea craft, spacecraft, automobile, or other vehicle type. Alternatively, the navigation system 101 may be fabricated as part of an object capable of being moved from one location to another. Additionally, the navigation system 101 may acquire navigation information from one or more different sources. To handle the acquired navigation information, the navigation system 101 may include a navigation computer 103. The navigation computer 103 may further include at least one processor 105 and at least one memory unit 107.

In certain embodiments, the navigation system 101 may receive navigation information that includes inertial motion information from the inertial navigation system 115. To provide the inertial motion information, the inertial navigation system 115 may include an IMU 123 that measures and senses inertial motion of the object associated with the inertial navigation system 115. Additionally, the inertial navigation system 115 provides an inertial navigation solution or inertial measurements to the navigation computer 103. For example, the IMU 123 may produce raw inertial data from a combination of inertial sensors 125. The inertial sensors 125 may include a combination of gyroscopes and accelerometers.

In certain embodiments, the gyroscopes of the inertial sensors 125 may include combinations of gyroscopes that provide combinations of angular velocity measurements along the X, Y, and Z axes of the IMU 123. Also, the accelerometers of the inertial sensors 125 may include combinations of accelerometers that provide combinations of acceleration or rate of change measurements along the X, Y, and Z axes. In additional implementations, the IMU 123 includes other sensors (not shown). For example, the other sensors can be non-motion sensors used to measure temperature changes, structural changes (e.g., strain gauges), changes in sensed magnetic fields (e.g., the magnetic field of the earth), and the like. As described herein, the inertial sensors 125 include different combinations of sensors that provide redundant measurements along the one or more axes of measurement. Also, the redundant sensors may provide measurements that are subject to different error sources and provide measurements having different levels of accuracy.

In exemplary embodiments, the IMU 123 includes an inertial processor 129. The inertial processor 129 receives the output from the inertial sensors 125 and processes the measurements from the inertial sensors 125. For example, the inertial processor 129 may combine the measurements from the inertial sensors 125 and provide an output to the inertial navigation system 115. Additionally, the IMU 123 may include fusion model 127 that provides instructions to the inertial processor 129 that direct the inertial processor 129 on fusing the measurements from the inertial sensors 125. While not shown, the inertial navigation system 115 may include an additional processor that processes the fused measurements from the inertial processor 129 and other measurements from other potential sensors to provide an inertial navigation solution to the processor 105 of the navigation computer 103. Alternatively, the inertial processor 129 may provide the fused measurements as an inertial navigation solution to the processor 105 of the navigation computer 103.

In further embodiments, the navigation system 101 may include additional sensors 119 that can provide additional measurements of navigation data. For example, the navigation system 101 may include one or more aiding sensors 118. The one or more aiding sensors 118 may include a vertical position sensor such as an altimeter. Also, the one or more aiding sensors 118 may include electro-optical sensors, magnetometers, barometric sensors, velocimeters, and/or other types of sensors.

Additionally, the navigation system 101 may also acquire GNSS measurements as additional measurements to calculate navigation information. For example, the additional sensors 119 may include a GNSS receiver 113 with at least one antenna 121 that receives satellite signals from multiple GNSS satellites observable to the at least one antenna 121. For example, the GNSS receiver 113 receives GNSS satellite signals from the presently visible GNSS satellites during operation. As used herein, the GNSS satellites may be any combination of satellites that provide navigation signals. For example, the GNSS satellites may be part of the global positioning system (GPS), GLONASS, Galileo system, COMPASS (BeiDou), or other satellite system that form part of a GNSS. The GNSS satellites may provide location information anywhere on the earth. The GNSS receiver 113 may provide the satellite signals to the navigation computer 103. The navigation computer 103 may extract position, velocity, and time data from the signals to acquire pseudorange measurements.

Accordingly, the navigation computer 103 may receive the GNSS signals from the GNSS receiver 113, additional navigation measurements from the additional sensors 119, and an inertial navigation solution (or inertial measurements) from the inertial navigation system 115. The processor 105 may act as an interface layer for fusing the measurements by executing a statistical filter, like a Kalman filter or other statistical filter. In certain embodiments, the filter is differentiable. The processor 105 uses the filter to generate a navigation solution 141 for the object associated with the navigation system 101.

After fabrication and periodically during the lifecycle of the IMU 123, the IMU 123 may be calibrated. During calibration, the inertial navigation system 115 (or the navigation computer 103) may be connected to a calibration computer 131. For example, the inertial navigation system 115 may provide the various measurements from the IMU 123 to a calibration computer 131 through a suitable (e.g., analog or digital) communication link. The communication link may be wired or wireless. The calibration computer 131 may connect to the inertial navigation system 115 during an initial calibration period. In some implementations, the calibration computer 131 may also connect to the navigation computer 103 for additional information from the additional sensors 119. Also, the calibration computer 131 may periodically connect to the inertial navigation system 115 during periodic maintenance as determined by an operator. While the calibration computer 131 is described herein as performing the calibration of the IMU 123. Other computational devices may perform the calibration function ascribed to the calibration computer 131. For example, the inertial processor 129, an inertial navigation system processor, the processor 105, or other computing device may perform substantially the same as the calibration computer 131.

In some embodiments, the calibration computer 131 includes a calibration processor 133 that executes machine learning instructions 137 stored on a memory unit 135. For example, the machine learning instructions 137 may instruct the calibration processor 133 to execute one or more machine learning algorithms. As described herein, a machine learning algorithm may be an algorithm that improves the performance of a computer when completing a task through experience with data. For example, the machine learning algorithms may include deep learning algorithms, such as a deep neural network (DNN), a convolution neural network, an autoencoder, an attention-based DNN, or other machine learning algorithms.

In certain embodiments, the calibration computer 131 receives inertial measurement data sets produced by the inertial sensors 125 provided by the inertial navigation system 115 as an input to the machine learning algorithm to generate various models for fusing the measurements from the different inertial sensors 125. The inertial measurement data sets are sets of measurements from the different sensors that are time synchronized. For example, the calibration computer 131 may receive the inertial measurement data sets from the different inertial sensors 125. Using the inertial measurement data sets, the calibration computer 131 may execute the machine learning instructions 137 to create models for extracting features from the inertial measurements. Additionally, the calibration computer 131 may receive the extracted feature data sets from the inertial navigation system 115 or extract the features from the inertial measurement data sets from the inertial navigation system 115 without using a model produced by the machine learning algorithms. Further, the calibration computer 131 may execute additional machine learning instructions 137 to create a model for selecting sensors and applying weights to the extracted features. Moreover, after applying the weights and performing sensor selection, the calibration computer 131 may execute machine learning instructions 137 that cause the calibration processor 133 to create a model for compensating and fusing the weighted sensor measurements.

In certain embodiments, when creating models for calculating transformations for feature extraction, weights for sensor selection, and compensation values for sensor fusion, the calibration computer 131 may receive truth data 139. As used herein, the truth data 139 may refer to data that more closely represents the actual navigation state of the object associated with the navigation system 101 than the measurements provided by the inertial sensors 125 within the inertial navigation system 115. For example, when used as an input for the machine learning algorithms, the truth data 139 may include ground truth accelerations and angular rates (from either a rate table or higher grade IMU) along with other test signals. Also, the truth data 139 may include measurements from the additional sensors 119, where the additional sensors 119 provide measurements subject to different errors or that have different accuracy levels than the measurements from the inertial sensors 125. The calibration processor 133 uses the truth data 139 as an input for the machine learning algorithms to learn how to fuse the measurements from the inertial sensors 125 more accurately.

In some embodiments, the calibration computer 131 may create models to calculate transformations for feature extraction, apply weights for sensor selection, and compensate measurements for sensor fusion as the same process. For example, the calibration computer 131 may compare the resultant values from performing the compensation values for sensor fusion against the truth data 139, wherein the calibration processor 133 calculates the weights and adjustments from executing the machine learning instructions 137 for the feature extraction, sensor selection, and sensor fusion based on the comparison of the output IMU 123 against the truth data 139.

In alternative embodiments, the calibration computer 131 may create separate models based on separate comparisons of the feature extraction results, sensor selection, and compensation values against the truth data 139. For example, the calibration processor 133 may create a model for feature extraction by comparing the feature extraction output against the truth data 139. Also, the calibration processor 133 may create a model for sensor selection and weight application by comparing the output of the sensor selection against the truth data 139. Additionally, the calibration processor 133 may create a model for compensating and fusing the weighted measurements by comparing the output of the compensation values against the truth data 139.

In certain embodiments, when the calibration computer 131 has created the model, the calibration computer provides the model to the IMU 123 or inertial navigation system 115 for storage as the fusion model 127. During operation of the IMU 123, the inertial sensors 125 may provide measurements to the inertial processor 129, which applies the fusion model 127 to the received inertial measurements. The fusion model 127 directs the inertial processor 129 to extract the features from the measurements, select sensors providing the measurements and apply weights to the measurements, and then apply compensation coefficients to the weighted measurements, before fusing the measurements.

The inertial processor 129 may provide the output of the applied fusion model 127 as an inertial navigation solution for the IMU 123 or inertial navigation system 115.

The processor 105, inertial processor 129, calibration processor 133, and/or other computational devices used in the system 100, or other systems and methods described herein, may be implemented using software, firmware, hardware, or appropriate combinations thereof. In some implementations, the processor 105, inertial processor 129, calibration processor 133, or other computing device, may be a processor dedicated to performing machine learning, such as a tensor processing unit (TPU) or graphics processing unit (GPU). Further, a single processor may execute the functionality of any combination of the processor 105, inertial processor 129, and calibration processor 133. The processor 105, inertial processor 129, calibration processor 133, and other computational devices may be supplemented by, or incorporated in, specially-designed application-specific integrated circuits (ASICs) or field programmable gate arrays (FPGAs). In some implementations, the processor 105, inertial processor 129, calibration processor 133, and/or other computational devices may communicate through an additional transceiver with other computing devices outside of the navigation system 101, such as those associated with the management system 111 or computing devices associated with other subsystems controlled by the management system 111. The processor 105, inertial processor 129, calibration processor 133, and other computational devices can also include or function with software programs, firmware, or other computer-readable instructions for carrying out various process tasks, calculations, and control functions used in the methods and systems described herein.

In some embodiments, the functions of the processor 105, inertial processor 129, and calibration processor 133 are performed by one or more processors. For example, the processor 105 receives measurements from the additional sensors 119 and the inertial navigation system 115 and calculates the navigation solution 141. Alternatively, the navigation processor 105 may perform the functionality ascribed above to the calibration processor 133. For example, the memory unit 107 stores the machine learning instructions 137, which are then executed by the processor 105. When the processor 105 executes the machine learning instructions 137, the navigation system 101 may not be coupled to a calibration computer 131 when performing the calibration and compensation calculations. However, the navigation system 101 may receive commands from other computing systems to perform the calibration and compensation calculations.

The methods described herein may be implemented by computer-executable instructions, such as program modules or components, which are executed by at least one processor, such as the processor 105, the inertial processor 129, or the calibration processor 133. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor, or any programmable logic device. For instance, the memory unit 107, the memory unit 135, or memory that stores the fusion model 127 may be an example of a computer-readable medium capable of storing computer-readable instructions and/or data structures. The memory unit 107 may also store navigation information such as maps, terrain databases, magnetic field information, path data, and other navigation information.

Suitable computer-readable storage media (such as the memory unit 107, the memory unit 135, or the memory associated with the fusion model 127) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

Figure 2:
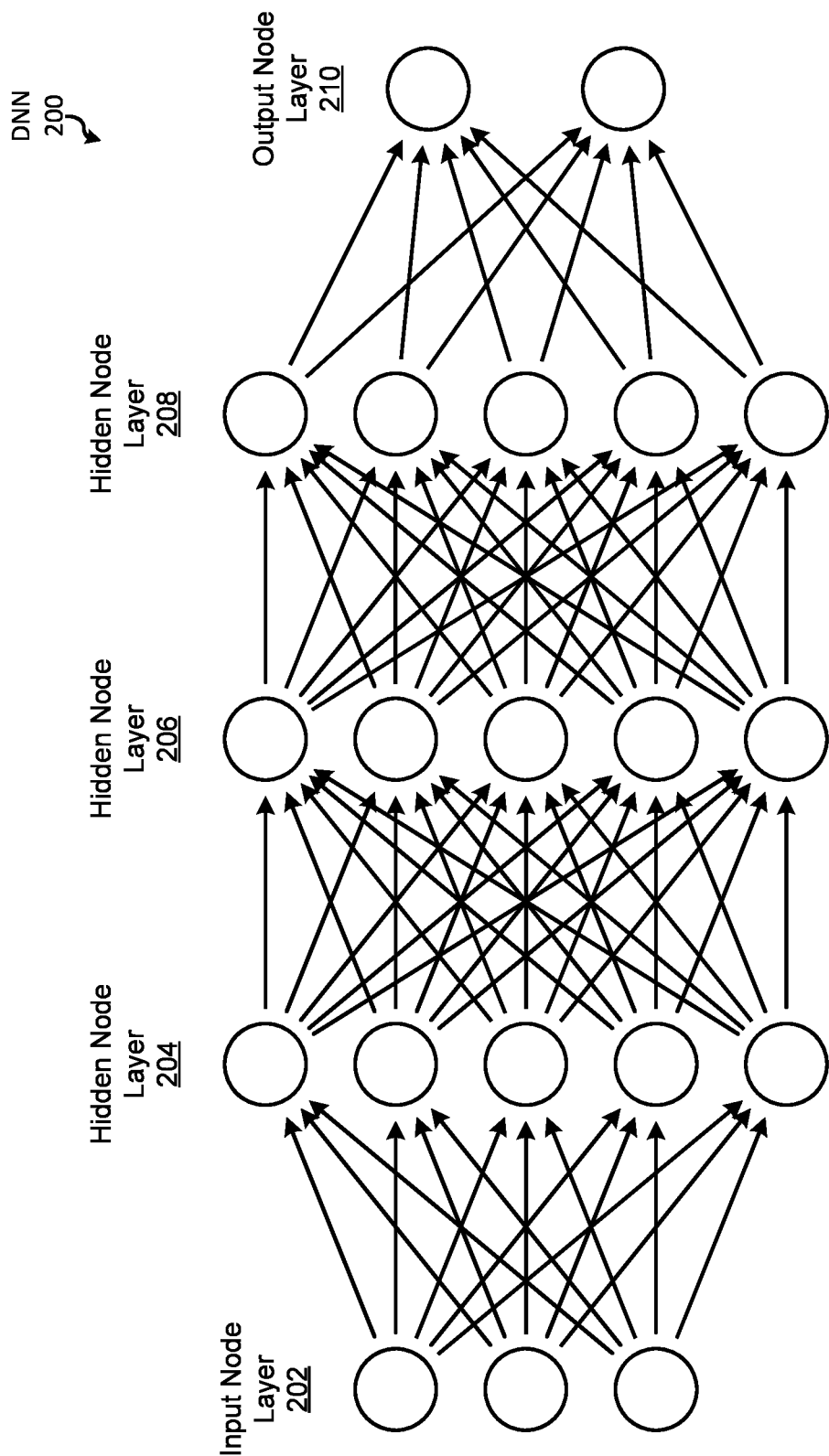
FIG. 2 is a schematic block diagram depicting the application of a Deep Neural Network (DNN) to at least one example embodiment described in the present disclosure.

FIG. 2 is a schematic block diagram depicting a DNN 200, which is an example of a machine learning algorithm that can be used to implement one example embodiment of the present invention. For this exemplary embodiment, the DNN 200 is implemented as a "multi-layer perceptron" neural network (e.g., network composed of numerous node layers). For example, the DNN 200 includes an input node layer 202, a plurality of hidden node layers 204, 206, 208, and an output node layer 210. Each node layer includes a plurality of nodes. Each node is a computational entity (e.g., loosely patterned on a neuron in the brain) that can be triggered to have "high activation" or "low activation" in response to an input. A node layer (e.g., 202, 204, 206, 208, or 210) is a row of these computational entities that can have "high activation" or "low activation" as an input signal is fed through the DNN 200. The output of each node layer is simultaneously the input to the subsequent node layer.

Notably, for this example embodiment, each node in the node layers 202, 204, 206, 208, and 210 combines the signal/data at its input with a respective set of coefficients or weights that amplify or dampen the input signal/data. Consequently, each node in the node layers 202, 204, 206, 208, and 210 assigns significance (e.g., weight) to its respective input concerning the task(s) the DNN algorithm is attempting to learn.

Notably, for this example embodiment, the DNN 200 is implemented as a learning algorithm. For example, during an exemplary learning process, the DNN 200 can be trained using truth (e.g., labeled) data provided, for example, by one or more high quality, calibrated sensors (e.g., operating under similar conditions as those of the sensors providing the raw data), or data provided by an external truth system (e.g., calibrated rate table). For example, in one embodiment, the learning process for the DNN 200 can be accomplished by utilizing truth (e.g., labeled) data for 70% of the data being input to the DNN, and the model validation or testing process for the DNN 200 can be accomplished by utilizing raw sensor data for the remaining 30% of the data being input to the DNN. However, in another embodiment, any suitable percentages other than 70% for the learning process and 30% for the model validation or testing process can be used. For this example embodiment, the input-weighted products of the nodes in the node layers 202, 204, 206, 208, and 210 are summed, and the sum of these products is passed through the node's activation function to determine whether, and to what extent, that input data (e.g., raw sensor data) can progress further through the DNN to affect the outcome.

More precisely, referring again to FIG. 1, the DNN may be implemented through the machine learning instructions 137 as a function approximator that maps inputs to outputs by finding correlations between the inputs and outputs. Notably, a DNN learns to approximate unknown functions such as, for example, the function f(x)=y, between any input x and any output y, if the input and output are related at all by any correlation. During the learning process, the DNN finds the correct manner of transforming the input "x" into the output "y". For example, referring to Equation (2), the input to the DNN can be represented in matrix form as $X = \mathbb{R}^n$, and the (e.g., approximate) output of the DNN can be represented in matrix form as $Y = \mathbb{R}^m$, As such, the approximated output, Y, of the DNN can be represented as:

$$Y \approx W_4(f_3(W_3(f_2(W_2(f_1(W_1 X + B_1) + B_2) + B_3) + B_4 \quad (3)$$

where the parameter, $f_3$, represents the activation function, and the function $f_1(W_1 X \times B_1)$ represents the function of the first column (e.g., layer) of nodes of the DNN having a weighted input $W_1 X$ and a bias $B_1$. Similarly, the parameter $f_2 (W_2 (f_1(W_1 X \times B_1) \times B_2)$ represents the function of the second column (e.g., layer) of nodes with the weight $W_2 X$ and bias $B_2$ added, and so on for the additional columns or layers. In other words, the output, Y, is an approximation of the sum of the weighted inputs, X, for the nodes in the DNN. As described earlier, the input-weight products are summed, and the sum of these products is passed through the node's activation function to determine whether and to what extent a particular input should progress further through the neural network to affect the outcome.

At this point, it is useful to note that, in a different embodiment, instead of utilizing a feedforward neural network (e.g., DNN) to compensate sensed input signals/data (e.g., X) at single time instances (e.g., as described above), a neural network that processes/compensates a continuum of the sensed input signals or data over a period of time could be utilized. For example, in other embodiments, a recurrent neural network (RNN), Convolutional Neural Network (CNN), Residual Networks (ResNets), auto-encoders, or combinations of various network blocks could compensate a continuum of sensor input signals or data received over a period of time.

In summary, referring again to FIG. 1, for the extraction of features from the different sensor measurement data sets from the inertial sensors 125 in the IMU 123, the raw sensor output signals from the different inertial sensors 125 can be represented as the weighted inputs, X, in Equation (3), and the extracted features for the measurements from the separate inertial sensors 125 produced by the calibration computer 131 can be represented as the output approximations, Y. As such, in accordance with the above-described teachings, a DNN-based methodology (or other machine learning methodology) is provided herein to implement a feature extraction that is more accurate than non-machine learning techniques for feature extraction techniques. For example, using machine learning, the inertial processor 129 can extract features for each sensor without understanding the physical characteristics of the different inertial sensors 125 or the environmental conditions under which the separate inertial sensors 125 operate.

Similarly, referring again to FIG. 1, for performing sensor selection and the application of weights to the extracted features from the measurements produced by the inertial sensors 125, the extracted features for the different inertial sensors 125 can be represented as the weighted inputs X, in Equation (3), and the weighted selected sensor measurements may represent the output approximations Y. As such, in accordance with the above-described teachings, a DNN-based methodology (or other machine learning methodology) is provided herein to apply weights to the extracted features and select weighted measurements from the inertial sensors 125 for subsequent fusion.

Additionally, referring again to FIG. 1, for the performance of compensation and fusion of the weighted sensor measurements, the weighted sensor measurements can be represented as the weighted inputs X, in Equation (3), and the fused IMU output may represent the output approximations Y. As such, in accordance with the above-described teachings, a DNN-based methodology (or other machine learning methodology) is provided herein to apply weights to the weighted sensor measurements for compensation and fusion.

In alternative embodiments, referring to FIG. 1, the machine learning methodology uses the inputs from the inertial sensors 125 and provides an output approximation of the fused IMU output. For example, the raw inertial measurement data sets from the inertial sensors 125 can be represented as the weighted inputs X, in Equation (3), and the fused IMU output may represent the output approximation Y. As such, in accordance with the above-described teachings, a DNN-based methodology (or other machine learning methodology) is provided herein to apply weights to the weighted sensor measurements for compensation and fusion.

Figure 3:
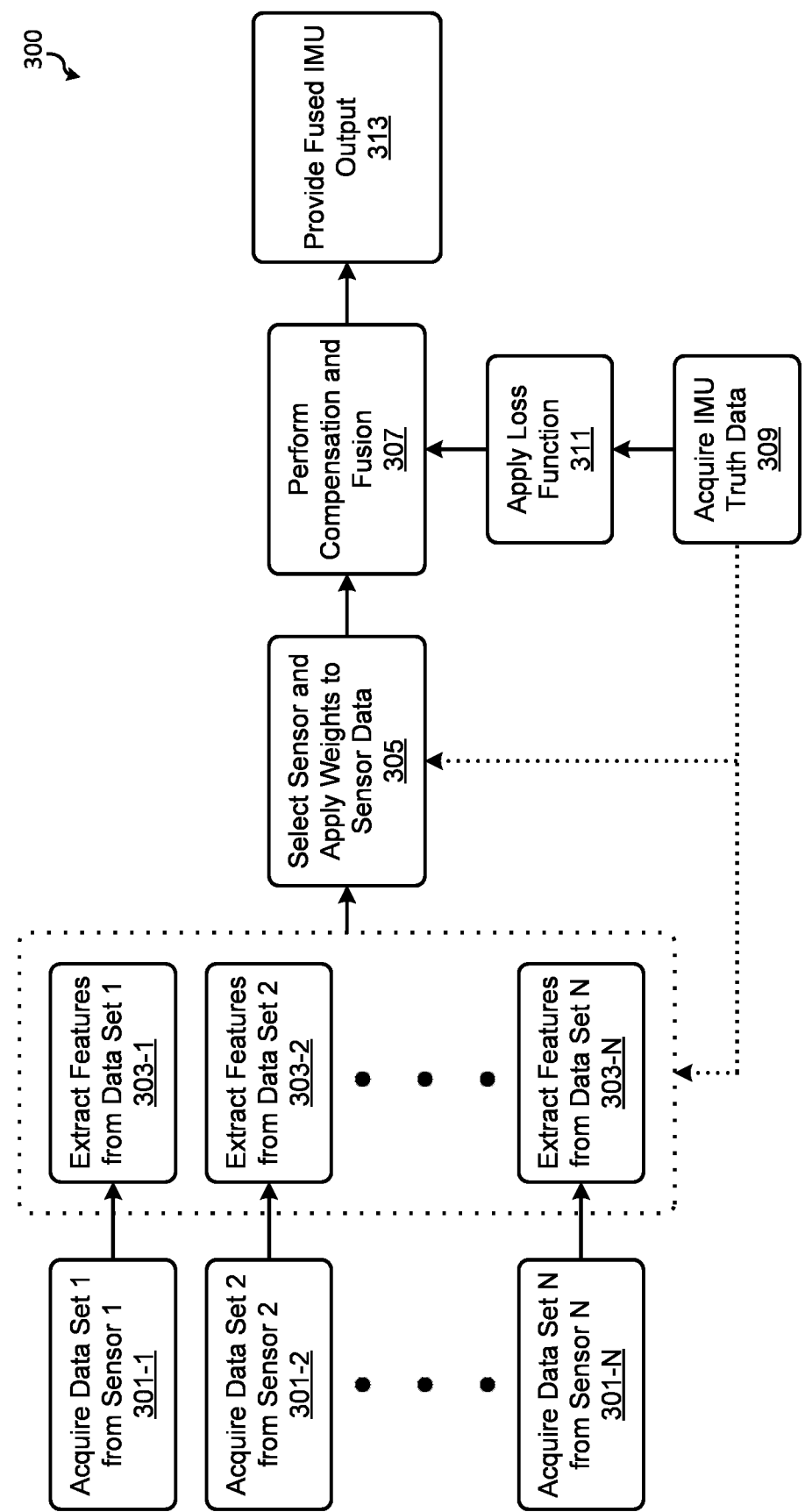
FIG. 3 is a flow diagram depicting a method for creating a model for fusing inertial sensor measurements according to at least one example embodiment described in the present disclosure.

FIG. 3 is a flowchart diagram of a method 300 illustrating the creation of a model for fusion and compensation of IMU measurements (such as the raw measurements from the inertial sensors 125 in FIG. 1). The model is created using machine learning to learn how to fuse and compensate the measurements from multiple IMUs. Referring to FIG. 1, the method 300 may be performed by the navigation computer 103, the calibration computer 131, the inertial processor 129, other computing device, or any combination of the mentioned computing devices.

As illustrated, the method 300 proceeds at 301-1-301-N, where N different inertial measurement data sets are acquired from N different inertial sensors. For example, an IMU 123 may include N different inertial sensors 125. The different inertial sensors 125 may each provide different inertial measurement data sets, where each inertial measurement data set includes various inertial measurements. For example, the method 300 may acquire a first data set from a first sensor that includes acceleration measurements at 301-1. Additionally, the method 300 may acquire a second data set from a second sensor that includes rotation rate measurements at 301-2. Further, the method 300 may acquire other combinations of inertial measurements in other data sets, where the data sets may have different levels of accuracy at 301-N. Further, the calibration processor 133, the inertial processor 129, or the processor 105 may time synchronize inertial measurement data sets produced by different inertial sensors 125 with one another. For example, the calibration processor 133, the inertial processor 129, or the processor 105 may associate inertial measurement data sets produced by different inertial sensors 125 at substantially the same time with one another. Alternatively, the calibration processor 133, the inertial processor 129, or the processor 105 may process the inertial measurement data sets from the different inertial sensors 125 in the order that the inertial measurement data sets are produced by the inertial sensors 125.

The method 300 then proceeds at 303-1-303-N, where features are extracted from the different data sets produced by the separate inertial sensors 125 in steps 301-1-301-N. A calibration processor 133 may determine how to extract the features from different inertial measurement data sets. For example, the calibration processor 133 uses the received inertial measurement data sets as inputs to a machine learning algorithm. The machine learning algorithm then calculates a transform that converts the different inertial measurement data sets from the different inertial sensors 125 into a more expressive feature space. As used herein, a "more expressive feature space" indicates that transformed measurement data sets from different inertial sensors are more comparable and more combinable, and the transformed measurement data sets more accurately describe motion of an associated object. For example, each inertial sensor 125 may provide different combinations of measurements. The different combinations may include measurements of acceleration and rotation that are taken along different axes, having different accuracies, and at different frequencies. The calibration processor 133 executes the machine learning instructions 137 to identify transforms that change the inertial measurement data sets from the inertial sensors 125 to the more expressive feature space. Alternatively, the calibration processor 133 may extract features from the inertial measurement data sets without using machine learning algorithms. For example, the calibration processor 133 may identify transforms that convert the inertial measurement data sets into the more expressive feature space using interpolation, translations, filters, and information about the physical relationship of the different inertial sensors in relation to one another and an associated vehicle.

In certain embodiments, where the features are extracted using a machine learning algorithm, the machine learning instructions 137 may direct the calibration processor 133 to implement a convolution neural network machine learning algorithm that includes a bank of convolution filters that slide along the input inertial measurement data sets to identify the transform for extracting features from the inertial measurement data sets. Alternatively, the machine learning instructions 137 may direct the calibration processor to implement an autoencoder machine learning algorithm to identify encodings between the inertial measurement data sets and the extracted features. The machine learning instructions 137 may learn the transforms that are implemented for each of the convolution filters. For example, the output of each of the convolution filters of the input signal generates a transform for application to the different inertial measurement data sets to transform the inertial measurement data sets into a more expressive feature space. Further, the transforms may also transform the inertial measurement data sets to be useful for subsequent processing. For example, an autoencoder machine learning algorithm may provide a model that rejects signals having frequencies that are not useful for calculating inertial navigation solutions, such as signals related to shocks and vibrations. Additionally, when learning the transforms with the convolution filters, the calibration processor 133 may receive ground truth data for comparing the output of the convolution filters against accurate navigation information. Further, while the extraction of features with a convolution neural network or autoencoders is described above, the extraction of features may also convert the inertial measurement data sets into other frequency-domain representations, time-domain embeddings, spectrograms, and the like.

In further embodiments, after learning how to extract features from the inertial measurement data sets, the method 300 may proceed at 305, where sensors are selected, and weights are applied to the sensor data. For example, the machine learning instructions 137 can direct the calibration processor 133 to execute machine learning algorithms that produce a model that determines which inertial sensors 125 produce inertial measurement data sets with the most value for a particular data sequence and how sensor measurements contribute to final outputs. Accordingly, the model produced by the machine learning algorithms can dynamically change sensor contributions and weights based on data sequences in the inertial measurement data sets. For instance, the machine learning instructions 137 may direct the calibration processor 133 to implement an attention-based DNN, where attention blocks in the attention-based DNN learn which sensors perform better under different conditions. Additionally, the calibration processor 133 may identify which inertial sensors 125 are providing inertial measurement data sets that can be used for subsequent sensor fusion. Thus, the sensor selecting and weighing uses machine learning to determine which of the inertial sensors 125 contribute measurements for subsequent fusion while weighing the contribution of the selected measurements.

In exemplary embodiments, when the machine learning algorithms determine how to select sensors and apply weights to the inertial measurement data sets produced by the selected sensors, the method 300 may proceed at 307, where compensation and fusion are performed. To perform the compensation and fusion of inertial measurement data sets, the method 300 also proceeds at 309 and 311 to acquire further data for performing the compensation and fusion. For example, at 309, the method 300 acquires IMU truth data. The IMU truth data is similar to the truth data 139 described above in connection with FIG. 1.

In some embodiments, at 311 of the method 300, a loss function is applied. As used herein, the loss function may refer to a penalty applied to the IMU data during the fusion. For instance, the loss function may represent an error between the ground truth data and the fused IMU data. As such, the loss function may act as an input to reduce the error between the ground truth data and the prediction from the fused and compensated IMU measurements. Additionally, the loss function may account for other physical effects that can be modeled and applied to the fused and compensated IMU measurements. For example, known physical limitations on one or more of the inertial sensors 125 may limit the performance of the inertial sensors 125. Also, the loss function can incorporate the effects of the known physical limitations of the inertial sensors 125 to provide information regarding the reliability of the inertial sensors 125.

In further embodiments, the loss function may be applied to both the compensated, fused data and the acquired truth data. For example, the calibration processor 133 iteratively adjusts the machine-learned weights, filters, blocks, or transforms based on comparing the outputs from the machine learning algorithms against the truth data. In performing the iterative comparisons, the calibration processor 133 may apply the loss function to the truth data, the compensated and fused data, or both.

In some embodiments, the calibration processor 133 adjusts the machine-learned models for the feature extraction, the sensor selection and weight application, and the compensation and fusion based on the sole comparison of the loss function (and ground truth data) applied to the compensated and fused data. Alternatively, the calibration processor 133 executes separate machine learning algorithms for the feature extraction, sensor selection and weight application, and the compensation and fusion. For example, the calibration processor 133 adjusts the machine-learned models for the feature extraction, the sensor selection and weight application, and the compensation and fusion based on different comparisons of the outputs of the feature extraction, the outputs of the sensor selection, and the compensation and fusion outputs to the ground truth data and applied loss function.

In certain embodiments, when performing the compensation and fusion, the calibration processor 133 calculates compensation and fusion using a feedforward neural network structure for error compensation and combining the weighted extracted features. Alternatively, the calibration processor 133 calculates the compensation and fusion using a recurrent neural network (such as long short-term memory (LSTM)/gated recurrent unit (GRU)) for time-varying compensation and correlation between the sensors.

In additional embodiments, when the calibration processor 133 has performed the compensation and fusion using the truth data and applied loss function, the method 300 proceeds at 313, where fused IMU output is provided. For example, the fused IMU output may include the fused and compensated measurements of the appropriately selected and weighted extracted features from the measurements produced by the inertial sensors 125. The resultant model(s) produced by the machine learning algorithms described in relation to method 300 may be stored on an IMU 123 as a fusion model 127 for use during operation of the IMU 123. By using machine learning to perform sensor fusion and compensation, the sensor fusion and compensation process can be automated. Additionally, navigation systems can learn representations of data streams from the inertial sensors 125 that are difficult to model using other modeling methods.

Figure 4:
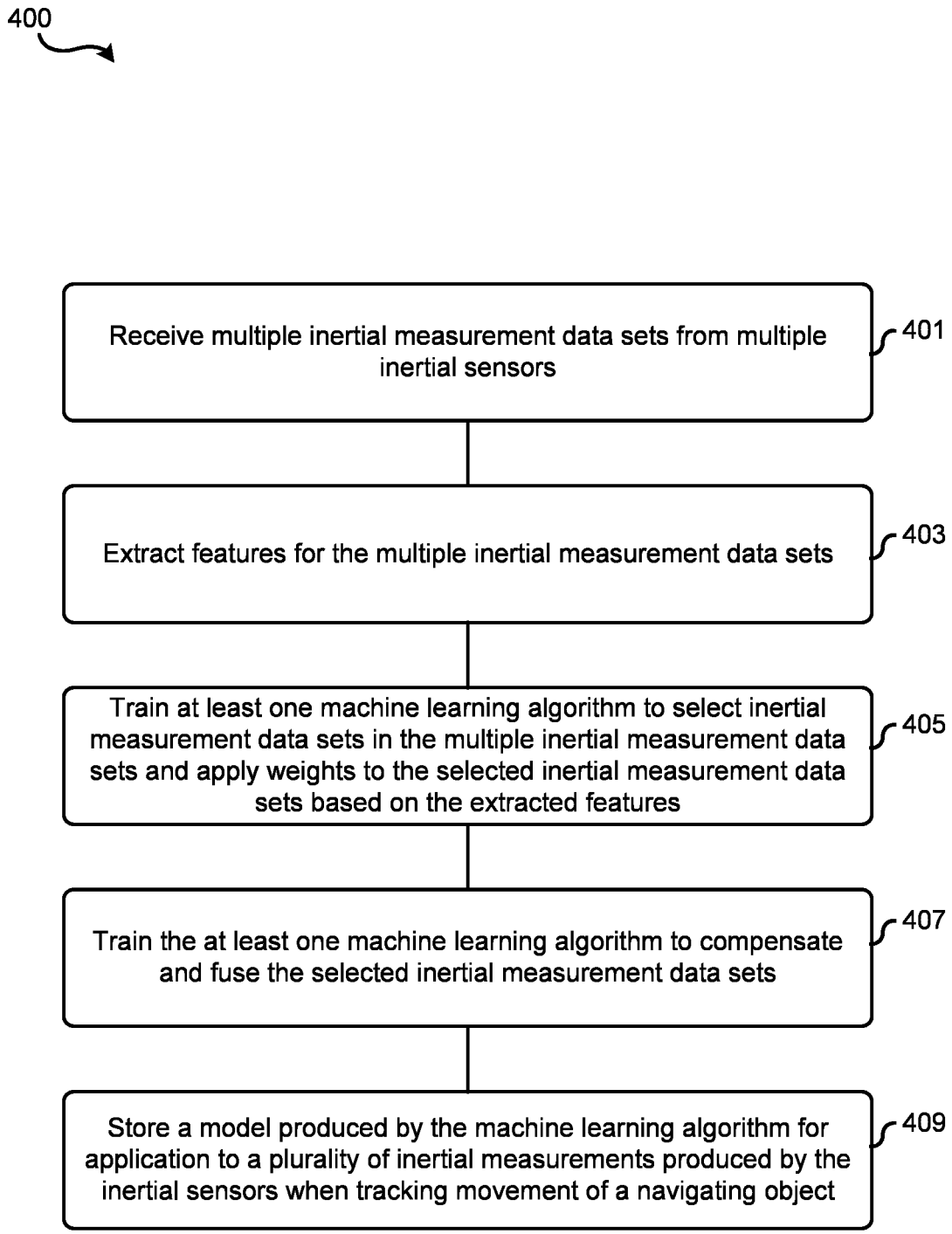
FIG. 4 is a flow diagram illustrating an additional method for creating a model for fusing inertial sensor measurements according to at least one example embodiment described in the present disclosure.

FIG. 4 is a flowchart diagram of a method 400 for fusing inertial sensor measurement data sets from multiple inertial sensors. The method 400 proceeds at 401, where multiple inertial measurement data sets are received from multiple inertial sensors. Additionally, the method 400 proceeds at 403, where features are extracted for the multiple inertial measurement data sets. In further embodiments, the method 400 proceeds at 405, where at least one machine learning algorithm is trained to select inertial measurement data sets in the multiple inertial measurement data sets and apply weights to the selected inertial measurement data sets based on the extracted features. Moreover, the method 400 proceeds at 407, where the at least one machine learning algorithm is trained to compensate and fuse the selected inertial measurement data sets. Further, the method 400 proceeds at 409, where a model produced by the machine learning algorithm is stored for application to a plurality of inertial measurements produced by the inertial sensors when tracking movement of a navigating object.

It should be understood that elements of the above-described embodiments and illustrative figures may be used in various combinations with each other to produce still further embodiments that are explicitly intended as within the scope of the present disclosure.

EXAMPLE EMBODIMENTS

Example 1 includes a method, comprising: receiving a plurality of inertial measurement data sets from a plurality of inertial sensors; extracting features from the plurality of inertial measurement data sets; training at least one machine learning algorithm to select inertial measurement data sets in the plurality of inertial measurement data sets and apply weights to the selected inertial measurement data sets based on the extracted features; training the at least one machine learning algorithm to compensate and fuse the selected inertial measurement data sets; and storing at least one fusion model produced by the at least one machine learning algorithm for application to a plurality of inertial measurements produced by the inertial sensors when tracking movement of a navigating object.

Example 2 includes the method of Example 1, wherein extracting the features for the plurality of inertial measurement data sets comprises training the at least one machine learning algorithm to extract the features from the plurality of inertial measurement data sets.

Example 3 includes the method of Example 2, wherein the at least one machine learning algorithm receives the plurality of inertial measurement data sets as an input and provides compensated and fused data as an output.

Example 4 includes the method of any of Examples 2-3, wherein the at least one machine learning algorithm comprises separately executing machine learning algorithms for extracting the features, selecting the inertial measurement data sets and applying the weights to the selected inertial measurement data sets, and compensating and fusing the selected inertial measurement data sets.

Example 5 includes the method of any of Examples 2-4, wherein training the at least one machine learning algorithm to extract the features for the plurality of inertial measurement data sets comprises at least one of: performing a convolutional neural network; performing an autoencoder; converting the inertial measurement data sets into at least one of: a frequency-domain representation; time-domain embedding; and spectrogram.

Example 6 includes the method of any of Examples 1-5, wherein the at least one machine learning algorithm compares an output of the at least one machine learning algorithm against truth data.

Example 7 includes the method of Example 6, wherein comparing the output against the truth data comprises applying a loss function, wherein the loss function is applied to at least one of the output and the truth data.

Example 8 includes the method of any of Examples 1-7, wherein training the at least one machine learning algorithm to select the inertial measurement data sets and apply the weights to the selected inertial measurement data sets comprises performing an attention-based deep neural network.

Example 9 includes the method of any of Examples 1-8, wherein training the at least one machine learning algorithm to select the inertial measurement data sets and apply the weights to the selected inertial measurement data sets comprises producing a model that dynamically selects the inertial measurement data sets and applies the weights based on one or more sequences of inertial measurements in the plurality of inertial measurement data sets.

Example 10 includes the method of any of Examples 1-9, wherein training the at least one machine learning algorithm to compensate and fuse the selected inertial measurement data sets comprises performing at least one of a feedforward neural network and a recurrent neural network.

Example 11 includes the method of any of Examples 1-10, wherein receiving the plurality of inertial measurement data sets further comprises time synchronizing the plurality of inertial measurement data sets from the plurality of inertial sensors.

Example 12 includes a system comprising: a plurality of inertial sensors that produce a plurality of inertial measurements; one or more memory units configured to store at least one fusion model produced by at least one machine learning algorithm; and one or more processors configured to receive the plurality of inertial measurements, wherein the one or more processors apply the at least one fusion model to the plurality of inertial measurements, wherein the at least one fusion model directs the one or more processors to: extract features from the plurality of inertial measurements; select inertial measurement data sets based on a sensor in the plurality of inertial sensors that produced the inertial measurement; apply weights to the selected inertial measurements based on the extracted features; apply compensation coefficients to the selected inertial measurements; and fuse the selected inertial measurement data sets into an inertial navigation solution.

Example 13 includes the system of Example 12, further comprising a calibration computer that is coupled to the one or more processors during a calibration process, wherein the calibration computer comprises: one or more calibration processors configured to receive a plurality of inertial measurement data sets from the plurality of inertial sensors; one or more calibration memory units that store machine learning instructions thereon, wherein the machine learning instructions direct the one or more calibration processors to perform the at least one machine learning algorithm to create the at least one fusion model, wherein the calibration processor is configured to: train the at least one machine learning algorithm to extract the features from the plurality of inertial measurement data sets; train the at least one fusion model to select inertial measurement data sets in the plurality of inertial measurement data sets and apply the weights to the selected inertial measurement data sets based on the extracted features; train the at least one machine learning algorithm to compensate and fuse the selected inertial measurement data sets; and store the at least one fusion model produced by the at least one machine learning algorithm on the one or more memory units.

Example 14 includes the system of Example 13, wherein the at least one machine learning algorithm comprises separately executed machine learning algorithms for identifying the features, selecting the inertial measurement data sets and applying the weights to the selected inertial measurement data sets, and compensating and fusing the selected inertial measurement data sets.

Example 15 includes the system of any of Examples 13-14, wherein the at least one machine learning algorithm comprises extracting the features from the plurality of inertial measurement data sets by performing at least one of: a convolutional neural network; an autoencoder; converting the inertial measurement data sets into at least one of: a frequency-domain representation; time-domain embedding; and spectrogram.

Example 16 includes the system of any of Examples 13-15, wherein the one or more processors is coupled to the one or more calibration processors during at least one of: a performance of an initial calibration; and periodic maintenance.

Example 17 includes the system of any of Examples 13-16, wherein the machine learning instructions further direct the one or more calibration processors to compare an output of the at least one machine learning algorithm against truth data, wherein the instructions further direct the one or more calibration processors to apply a loss function to at least one of the output and the truth data.

Example 18 includes the system of any of Examples 12-17, wherein the at least one machine learning algorithm uses an attention-based deep neural network to select the inertial measurement data sets and apply the weights to the selected inertial measurement data sets.

Example 19 includes the system of any of Examples 12-18, wherein the at least one machine learning algorithm uses at least one of a feedforward neural network and a recurrent neural network to compensate and fuse the selected inertial measurement data sets.

Example 20 includes a system, comprising: a plurality of inertial sensors that produce a plurality of inertial measurement data sets; one or more memory units; a source of truth data; and one or more processors configured to receive the plurality of inertial measurement data sets and the truth data, wherein executable instructions comprising machine learning instructions direct the one or more processors to: train at least one machine learning algorithm to extract features for the plurality of inertial measurement data sets; train the at least one machine learning algorithm to select inertial measurement data sets in the plurality of inertial measurement data sets and apply weights to the selected inertial measurement data sets based on the extracted features; train the at least one machine learning algorithm to compensate and fuse the selected inertial measurement data sets; wherein the at least one machine learning algorithm compares at least one output of the at least one machine learning algorithm against the truth data; and store at least one fusion model produced by the at least one machine learning algorithm on the one or more memory units for application to a plurality of inertial measurements produced by the plurality of inertial sensors when tracking movement of a navigating object.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method, comprising:
   receiving a plurality of inertial measurement data sets from a plurality of inertial sensors;
   extracting features from the plurality of inertial measurement data sets;
   training a first machine learning algorithm in multiple machine learning algorithms to select inertial measurement data sets in the plurality of inertial measurement data sets and apply weights to the selected inertial measurement data sets based on the extracted features;
   training a second machine learning algorithm in the multiple machine learning algorithms to compensate and fuse the selected inertial measurement data sets; and
   storing at least one fusion model produced by the multiple machine learning algorithms for application to a plurality of inertial measurements produced by the plurality of inertial sensors when tracking movement of a navigating object.

2. T method of claim 1, wherein extracting the features for the plurality of inertial measurement data sets comprises training the at least one machine learning algorithm to extract the features from the plurality of inertial measurement data sets.

3. The method of claim 2, wherein the at least one machine learning algorithm receives the plurality of inertial measurement data sets as an input and provides compensated and fused data as an output.

4. The method of claim 2, wherein the at least one machine learning algorithm comprises separately executing machine learning algorithms for extracting the LEARNING features, selecting the inertial measurement data sets and applying the weights to the selected inertial measurement data sets, and compensating and fusing the selected inertial measurement data sets.

5. The method of claim 2, wherein training the at least one machine learning algorithm to extract the features for the plurality of inertial measurement data sets comprises at least one of:
   performing a convolutional neural network;
   performing an auto-encoder;
   converting the inertial measurement data sets into at least one of:
      a frequency-domain representation;
      time-domain embedding; and
      spectrogram.

6. The method of claim 1, wherein the at least one machine learning algorithm compares an output of the at least one machine learning algorithm against truth data.

7. The method of claim 6, wherein comparing the output against the truth data comprises applying a loss function, wherein the loss function is applied to at least one of the output and the truth data.

8. The method of claim 1, wherein training the at least one machine learning algorithm to select the inertial measurement data sets and apply the weights to the selected inertial measurement data sets comprises performing an attention-based deep neural network.

9. The method of claim 1, wherein training the at least one machine learning algorithm to select the inertial measurement data sets and apply the weights to the selected inertial measurement data sets comprises producing a model that dynamically selects the inertial measurement data sets and applies the weights based on one or more sequences of inertial measurements in the plurality of inertial measurement data sets.

10. The method of claim 1, wherein training the at least one machine learning algorithm to compensate and fuse the selected inertial measurement data sets comprises performing at least one of a feedforward neural network and a recurrent neural network.

11. The method of claim 1, wherein receiving the plurality of inertial measurement data sets further comprises time synchronizing the plurality of inertial measurement data sets from the plurality of inertial sensors.

12. A system comprising:
   a plurality of inertial sensors that produce a plurality of inertial measurements;
   one or more memory units configured to store at least one fusion model produced by at least one machine learning algorithm; and
   one or more processors configured to receive the plurality of inertial measurements, wherein the one or more processors apply the at least one fusion model to the plurality of inertial measurements, wherein the at least one fusion model directs the one or more processors to:
      extract features from the plurality of inertial measurements;
      transform the extracted features into a more expressive feature set, wherein expressive features are comparable and combinable with each other;
      select inertial measurements based on a sensor in the plurality of inertial sensors that produced the inertial measurements in the plurality of inertial measurements;

apply weights to the selected inertial measurements based on the extracted features;
apply compensation coefficients to the selected inertial measurements; and
fuse the selected inertial measurements into an inertial navigation solution.

13. The system of claim 12, further comprising a calibration computer that is coupled to the one or more processors during a calibration process, wherein the calibration computer comprises:
one or more calibration processors configured to receive a plurality of inertial measurement data sets from the plurality of inertial sensors;
one or more calibration memory units that store machine learning instructions thereon, wherein the machine learning instructions direct the one or more calibration processors to perform the at least one machine learning algorithm to create the at least one fusion model, wherein the calibration processor is configured to:
train the at least one machine learning algorithm to extract the features from the plurality of inertial measurement data sets;
train the at least one fusion model to select inertial measurement data sets in the plurality of inertial measurement data sets and apply the weights to the selected inertial measurement data sets based on the extracted features;
train the at least one machine learning algorithm to compensate and fuse the selected inertial measurement data sets; and
store the at least one fusion model produced by the at least one machine learning algorithm on the one or more memory units.

14. The system of claim 13, wherein the at least one machine learning algorithm comprises separately executed machine learning algorithms for identifying the features, selecting the inertial measurement data sets and applying the weights to the selected inertial measurement data sets, and compensating and fusing the selected inertial measurement data sets.

15. The system of claim 13, wherein the at least one machine learning algorithm comprises extracting the features from the plurality of inertial measurement data sets by performing at least one of:
a convolutional neural network;
an auto-encoder;
converting the inertial measurement data sets into at least one of:
a frequency-domain representation;
time-domain embedding; and
spectrogram.

16. The system of claim 13, wherein the one or more processors is coupled to the one or more calibration processors during at least one of:
a performance of an initial calibration; and
periodic maintenance.

17. The system of claim 13, wherein the machine learning instructions further direct the one or more calibration processors to compare an output of the at least one machine learning algorithm against truth data, wherein the instructions further direct the one or more calibration processors to apply a loss function to at least one of the output and the truth data.

18. The system of claim 12, wherein the at least one machine learning algorithm uses an attention-based deep neural network to select the inertial measurement data sets and apply the weights to the selected inertial measurement data sets.

19. The system of claim 12, wherein the at least one machine learning algorithm uses at least one of a feedforward neural network and a recurrent neural network to compensate and fuse the selected inertial measurement data sets.

20. A system, comprising:
a plurality of inertial sensors that produce a plurality of inertial measurement data sets;
one or more memory units;
a source of truth data; and
one or more processors configured to receive the plurality of inertial measurement data sets and the truth data, wherein executable instructions comprising machine learning instructions direct the one or more processors to:
train a first machine learning algorithm in multiple machine learning algorithms to extract features for the plurality of inertial measurement data sets and transform the extracted features into a more expressive feature set, wherein expressive features are comparable and combinable with each other;
train a second machine learning algorithm in the multiple machine learning algorithms to select inertial measurement data sets in the plurality of inertial measurement data sets and apply weights to the selected inertial measurement data sets based on the extracted features;
train a third machine learning algorithm in the multiple machine learning algorithms to compensate and fuse the selected inertial measurement data sets;
wherein the multiple machine learning algorithms compares at least one output of the multiple machine learning algorithms against the truth data; and
store at least one fusion model produced by the multiple machine learning algorithms on the one or more memory units for application to a plurality of inertial measurements produced by the plurality of inertial sensors when tracking movement of a navigating object.

* * * * *